US009639280B2

(12) United States Patent
Roberts

(10) Patent No.: US 9,639,280 B2
(45) Date of Patent: May 2, 2017

(54) ORDERING MEMORY COMMANDS IN A COMPUTER SYSTEM

(71) Applicant: Advanced Micro Devices, Inc., Sunnyvale, CA (US)

(72) Inventor: David A. Roberts, Santa Cruz, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 4 days.

(21) Appl. No.: 14/743,091

(22) Filed: Jun. 18, 2015

(65) Prior Publication Data

US 2016/0371014 A1 Dec. 22, 2016

(51) Int. Cl.
- *G06F 12/00* (2006.01)
- *G06F 3/06* (2006.01)
- *G06F 13/00* (2006.01)
- *G06F 13/28* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC ..... G06F 3/0611; G06F 3/0659; G06F 3/0673
See application file for complete search history.

(56) References Cited

U.S. PATENT DOCUMENTS

| 8,321,627 | B1* | 11/2012 | Norrie | G06F 13/161 365/185.33 |
| 2003/0033493 | A1* | 2/2003 | Cismas | G06F 13/1626 711/158 |
| 2003/0225969 | A1* | 12/2003 | Uchida | G06F 1/32 711/112 |
| 2007/0079218 | A1* | 4/2007 | Nagai | G06F 11/106 714/763 |
| 2008/0162852 | A1* | 7/2008 | Kareenahalli | G06F 12/0215 711/167 |
| 2011/0258353 | A1* | 10/2011 | Wang | G06F 13/1642 710/110 |
| 2012/0066413 | A1* | 3/2012 | Tokoro | G06F 3/0605 710/6 |
| 2013/0212330 | A1* | 8/2013 | Brittain | G11C 11/40607 711/106 |

OTHER PUBLICATIONS

Rachata Ausavarungnirun et al., "Staged Memory Scheduling: Achieving High Performance and Scalability in Heterogeneous Systems," International Symposium on Computer Architecture, Jun. 2012.

Jamie Liu et al., "RAIDR: Retention-Aware Intelligent DRAM Refresh," International Symposium on Computer Architecture, Jun. 2012.

* cited by examiner

*Primary Examiner* — Mark Giardino, Jr.

(74) *Attorney, Agent, or Firm* — Park, Vaughan, Fleming & Dowler LLP

(57) ABSTRACT

The disclosed embodiments provide a system for processing a memory command on a computer system. During operation, a command scheduler executing on a memory controller of the computer system obtains a predicted latency of the memory command based on a memory address to be accessed by the memory command. Next, the command scheduler orders the memory command with other memory commands in a command queue for subsequent processing by a memory resource on the computer system based on the predicted latency of the memory command.

17 Claims, 4 Drawing Sheets

TIMESTAMP
TABLE
230

| Command ID | Options | Start Time | End Time |
|---|---|---|---|
| 0 | MLC, ECC, Write | 345 | 428 |
| 1 | SLC, Read | 400 | 446 |
| 2 | SLC, Write | 483 | |
| 3 | MLC, ECC, Write | 427 | |

302 — Command ID
304 — Options
306 — Start Time
308 — End Time
310 — row 0
312 — row 1
314 — row 2
316 — row 3

FIG. 3

| Valid | Memory Address | Number of Blocked Commands | Average Latency of Blocked Commands |
|---|---|---|---|

402 — Valid
404 — Memory Address
406 — Number of Blocked Commands
408 — Average Latency of Blocked Commands

FIG. 4

ORDERING MEMORY COMMANDS IN A COMPUTER SYSTEM

BACKGROUND

Field

The disclosed embodiments relate to computer systems. More specifically, the disclosed embodiments relate to techniques for ordering memory commands in computer systems based on the latency of the memory commands and/or other properties of the memory commands.

Related Art

A number of memory technologies are associated with latencies that vary by memory location and/or type of memory access. For example, one region (i.e., physical area) of memory may have consistently higher latencies than another region of memory in the same computer system. As a result, a memory operation involving one region of memory may have a different latency than a memory operation involving another region of memory. Similarly, write commands may have significantly higher latencies than read commands. Thus, a high-latency write command to a memory bank may block a number of critical read commands to the same memory bank. These variations in latency may further be affected by factors such as process variations, temperature, wear-out levels, error-correcting logic, and/or density modes of memory cells. The variation in latencies may interfere with the efficient scheduling and/or execution of memory commands in computer systems.

BRIEF DESCRIPTION OF THE FIGURES

FIG. 3 shows a timestamp table in accordance with some embodiments.

FIG. 4 shows an entry in a write monitor in accordance with some embodiments.

In the figures, like reference numerals refer to the same figure elements.

DETAILED DESCRIPTION

Figure 1:
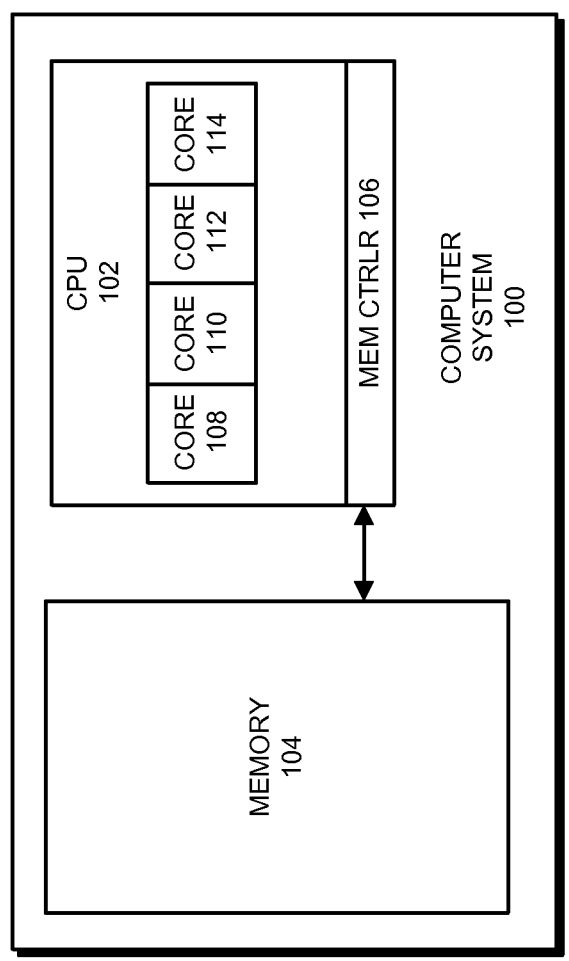
FIG. 1 shows a computer system in accordance with some embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments include a method and system for processing memory commands on a computer system. The memory commands may be generated based on memory requests from a processor such as a central-processing unit (CPU). For example, the CPU may use a memory request to read from and/or write to memory in the computer system. A memory controller on the computer system may process the memory request by converting the memory request into a series of memory commands, queuing the memory commands, and/or issuing the memory commands to one or more memory banks.

More specifically, the disclosed embodiments may improve the efficiency of the processing of memory commands by ordering the memory commands based on latency and/or other aspects/properties of the memory commands. The memory controller may include a command scheduler that obtains a predicted latency of a given memory command based on a memory address to be accessed by the memory command. The predicted latency may also be based on an operating mode of a memory resource (e.g., a memory bank) to be used in subsequent processing of the memory command and/or a type of the memory command. For example, the predicted latency may be tracked in a latency table as the running average latency and/or most recent latency of the memory command involving the memory address, a corresponding memory instruction pointer, and/or a corresponding thread identifier, along with the type (e.g., read, write, activate, pre-charge, etc.) of the memory command and/or the operating mode (e.g., number of bits per memory cell, error-correcting code, etc.) of the memory resource.

Next, the command scheduler may order the memory command with other memory commands in a command queue for subsequent processing by the memory resource based on the predicted latency of the memory command. For example, the command scheduler may expedite execution of the memory command by the memory resource over the other memory commands if the memory command is associated with higher latency and/or priority than the other memory commands by placing the memory command before the other memory commands in the command queue. The ordering of the memory commands may also be affected by attributes such as the priorities and/or power consumption of each memory command. For example, a higher-priority memory command (e.g., from a real-time process) may be ordered ahead of lower-priority memory commands, independently of the predicted latencies of the memory commands. Conversely, memory commands in the command queue may not be reordered if such reordering increases the power consumption of the computer system.

When a given memory command is issued from the command queue to a memory resource, the command scheduler may track the start and end times of the memory command. For example, the command scheduler may add an entry representing the memory command to a timestamp table of in-flight memory commands in the computer system as the memory command is issued. The entry may include the start time of the memory command (e.g., the time at which the memory command is issued from the command queue). When the memory command is completed, the command scheduler may update the end time for the memory command (e.g., the time at which the memory command is completed by the memory resource) in the timestamp table.

The entries in the timestamp table may then be used to update the predicted latency of the memory command. For example, the start and end times may be used to calculate the most recent latency of the memory command, and the most recent latency may be used to update the predicted latency of the memory command in the latency table. The latency table may subsequently be used to provide the predicted latency of the memory command when the command scheduler encounters the same memory command.

When the predicted latency exceeds a latency threshold, the command scheduler may delay issuance of the memory command until a delay condition is met. For example, the command scheduler may identify, from the latency table, a high-latency write command that blocks subsequent read commands to the same memory resource. To improve performance, the command schedule may wait to issue the write command until a fixed-time out has passed, an average number of blocked reads to the memory resource has already been issued, the memory resource is idle, and/or another delay condition is met. While the write command is delayed, the write command may be placed/stored/held in a defer queue or another location.

In some embodiments, while issuance of a write command is delayed, the write command may be used to forward data to later read commands directed to the memory address. For example, data to be written by the write command may be provided to the later read commands to enable execution of the read commands before the write command is committed by the memory resource.

By performing the above-described ordering and/or scheduling of memory commands, the disclosed embodiments may improve the performance of the computer system and adapt the execution of the computer system to various emerging memory technologies.

Computer System

FIG. 1 presents a block diagram illustrating a computer system 100 in accordance with some embodiments. As can be seen in FIG. 1, computer system 100 includes central processing unit (CPU) 102 and memory 104. CPU 102 is a functional block that performs computational operations. CPU 102 includes cores 108-114, each of which is a separate functional block that performs computational operations. For example, in some embodiments each of cores 108-114 is a microprocessor core, an embedded processor, an ASIC, etc.

Memory 104 is a functional block that performs operations for storing and providing data and instructions to the functional blocks in computer system 100. Memory 104 comprises memory circuits such as one or more of DRAM, DDR SDRAM, and/or other types of volatile and/or non-volatile memory circuits that are used for storing instructions and data for the other functional blocks, as well as control circuits for handling accesses of the instructions and data that are stored in the memory circuits. In some embodiments, memory 104 is the main memory in computer system 100.

CPU 102 includes memory controller 106 ("MEM CTRLR 106"). Memory controller 106 is a functional block that performs operations for handling interactions between CPU 102 and memory 104. For example, memory controller 116 can handle reading data from and writing data to memory 104, control the memory circuits in memory 104, etc.

In some embodiments, communication paths (that include one or more busses, wires, and/or connections) are coupled between the various functional blocks in computer system 100 (CPU 102, memory 104, etc.), as shown by arrow-headed lines between the elements. The communication paths are used to transmit commands, data, event notifications, and/or other information between the functional blocks.

Although computer system 100 is described with a particular arrangement of functional blocks, some embodiments include a different number and/or arrangement of functional blocks. For example, some embodiments have multiple CPUs 102. Generally, the described embodiments can use any number or arrangement of functional blocks that perform the operations herein described.

In addition, although computer system 100 is simplified for illustrative purposes, in some embodiments, computer system 100 includes additional functional blocks/elements for performing the operations herein described and/or other operations. For example, computer system 100 may include graphics processing unit(s) (GPUs), power controllers, batteries, media processors, communication mechanisms (e.g., a northbridge, a southbridge, etc.), peripheral devices, I/O devices, networking subsystems, display subsystems, etc.

Computer system 100 can be, or can be included in, any electronic device that performs computational operations. For example, computer system 100 can be, or can be included in, electronic devices such as desktop computers, laptop computers, wearable computing devices, tablet computers, smart phones, servers, network appliances, toys, audio-visual equipment, home appliances, controllers, etc., and/or combinations thereof.

Ordering of Memory Commands

In some embodiments, computer system 100 orders memory commands from CPU 102 and/or another processor based on the latency and/or other aspects or properties of the memory commands. The ordering of memory commands may be performed by memory controller 106 to expedite processing of memory commands with higher latency and/or priority. In turn, the memory commands may be executed more quickly on computer system 100 than on computer systems that do not order memory commands based on latency.

Figure 2:
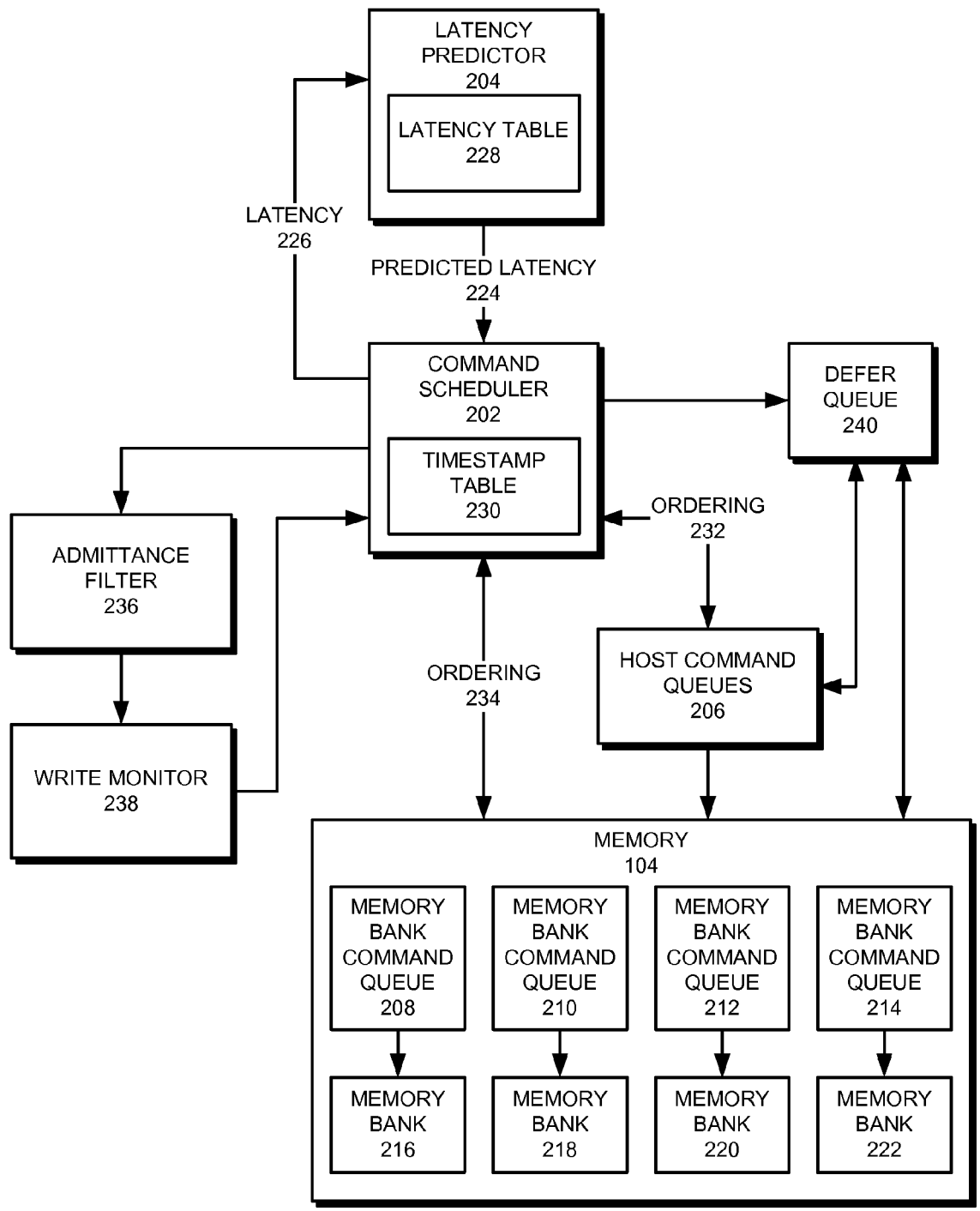
FIG. 2 shows a system for processing a memory command in a computer system in accordance with some embodiments.

FIG. 2 shows a system for processing a memory command in a computer system (e.g., computer system 100 of FIG. 1) in accordance with some embodiments. As shown in FIG. 2, the system includes a command scheduler 202 and a latency predictor 204 that execute on memory controller 106 and/or another component of computer system 100. For example, memory controller 106 and/or another component of computer system 100 may execute program code, firmware, etc. to perform operations for some or all of command scheduler 202 and latency predictor 204.

Memory requests from CPU 102 and/or other processors may be received by memory controller 106 in one or more host command queues 206. Command scheduler 202 may obtain the memory requests from host command queues 206, translate the memory requests into sequences of memory commands, and place the memory commands into a set of memory bank command queues 208-214 (e.g., bank FIFOs) for subsequent execution by memory banks 216-222 in memory 104. For example, memory controller 106 may direct each memory command to a memory bank command queue for a memory bank that contains the memory address to be accessed by the memory command.

To expedite processing of memory requests and/or memory commands in computer system 100, command scheduler 202 may reorder memory requests in host command queues 206 and/or memory commands in memory bank command queues 208-214. As mentioned above, such reordering may be based on latencies of the memory commands, which may be affected by a number of factors. First, variations in memory access latencies to different memory addresses may be affected by the distances to locations of the different memory addresses, process variation, temperature, wear-out levels, and/or other physical factors. Second, different types of memory commands may have different latencies in accessing the same memory address. For example, a write command may have a significantly higher latency than a read command to the same memory address.

Other types of memory commands, such as activate commands that move rows of data from memory arrays in memory banks 216-222 to row buffers in memory banks 216-222 and/or pre-charge commands that restore open rows in row buffers back to the memory arrays, may have latencies that differ from read and write latencies for the same memory banks 216-222. Third, memory 104 latencies may be affected by the operating modes of memory banks 216-222, such as a number of bits per memory cell (e.g., single-level cell (SLC) or multi-level cell (MLC)) and/or error-correcting codes used by memory banks 216-222.

In some embodiments, command scheduler 202 and latency predictor 204 track the latencies of various memory commands and order the memory commands in host command queues 206 and/or memory bank command queues 208-214 based on the latencies. For each memory command created by memory controller 106, command scheduler 202 may obtain a predicted latency 224 for the memory command from latency predictor 204.

Latency predictor 204 may maintain a latency table 228 containing predicted latencies of memory commands in computer system 100. Each entry in latency table 228 may include a predicted latency (e.g., predicted latency 224) for a memory command that accesses a given memory address. The predicted latency may be based on an average latency of the memory command, an average of the N most recent latency or latencies observed for the memory command (where N≥1), and/or other metrics representing the latency of the memory command. For example, the predicted latency may be calculated as the average of the 10 most recent latencies for the memory command. If a memory command does not have a predicted latency, latency predictor 204 may provide a default (e.g., "typical") value for the predicted latency of the memory command.

To improve the accuracy of predicted latencies for memory commands, latency predictor 204 may also categorize entries in latency table 228 by operating mode (e.g., SLC, MLC, error-correcting codes, etc.) and/or memory command type (e.g., read, write, activate, pre-charge). For example, each entry in latency table 228 may include a predicted latency for a memory command, along with one or more elements that specify a type of the memory command and/or one or more operating modes associated with a memory resource (e.g., memory banks 216-222) used to execute the memory command.

Those skilled in the art will appreciate that latency table 228 may be implemented in a variety of ways. First, latency table 228 may associate a predicted read and write latency with every memory address in memory 104. Alternatively, latency table 228 may include a subset of memory addresses that have particularly high or low latencies (e.g., more than 10% different from average latency) and omit memory addresses with relatively "normal" latencies (e.g., within 10% of average latency). As another alternative, latency predictor 204 may group memory addresses in an address space of computer system 100 into a set of memory address regions and maintain a predicted latency for each of the memory address regions instead of individual memory addresses. In these embodiments, the predicted latency for a region of memory is used for all of the memory addresses in the region.

Latency table 228 may also be stored and/or copied to other locations in computer system 100. For example, latency table 228 may be provided to applications executing in computer system 100 to allow the applications to identify fast or slow regions of memory and perform data placement and/or mapping accordingly. Similarly, some or all of latency table 228 may be saved to disk so that latency information for memory 104 is available to the operating system and/or one or more applications on computer system 100 after computer system 100 restarts.

Finally, latency predictor 204 may maintain latency table 228 in a set of Bloom filters. Each Bloom filter may represent a range of latencies (e.g., a range of nanoseconds) associated with a type of memory command (e.g., a read or a write). If a latency of a memory address falls within a given range, one or more hash functions may be used to map the memory address to a number of bits, which are set in the corresponding Bloom filter. When command scheduler 202 subsequently requests predicted latency 224 for a memory command to the memory address, latency predictor 204 may identify the Bloom filter with the corresponding bits set and return the latency range represented by the Bloom filter.

For example, a Bloom filter may represent a range of latencies (e.g., a range of nanoseconds) for a write command to a single-level cell with an error-correcting code. If a write command with an error-correcting code to a single-level cell has a latency that falls within the range, the memory address of the write command may be recorded in the Bloom filter by setting one or more bits in the Bloom filter representing one or more hashes to which the memory address is mapped. The predicted latency of the write command may subsequently be determined by searching the set of Bloom filters representing write commands to single-level cells with error-correcting codes for the Bloom filter with bits set that represent the memory address and returning the range of latencies represented by the Bloom filter.

After predicted latency 224 is provided by latency predictor 204, command scheduler 202 may use predicted latency 224 to provide one or more orderings 232-234 of the memory command with other memory commands in host command queues 206 and/or memory bank command queues 208-214. For example, command scheduler 202 may order a high-latency memory command ahead of lower-latency memory commands in a host command queue and/or a memory bank command queue to reduce the overall delay in processing the memory command. As used herein, "ordering" includes storing memory commands in the corresponding queue in a determined sequence so that the first memory command in the sequence can be retrieved from the corresponding queue and executed as the corresponding memory resource (e.g., the associated memory bank 216-222) becomes available for processing the next available command in the corresponding queue. Once the memory command is issued to the memory resource, the memory command is removed from the queue. Such orderings 232-234 may be performed in conjunction with other ordering or scheduling techniques, such as first-ready first-come first-serve (FRFCFS), banked first-in first-out (FIFO), and/or hold grant.

Command scheduler 202 may also order memory commands in command queues 206-214 based on other attributes associated with execution of the memory commands. More specifically, command scheduler 202 may consider the priority and/or power consumption of a memory command during ordering or reordering of the memory command with other memory commands in a command queue. For example, command scheduler 202 may ignore predicted latency 224 for the memory command and order the memory command ahead of other memory commands in the command queue if the memory command is flagged as high-priority. In another example, command scheduler 202 may avert reordering of the memory commands in a memory bank command queue if such reordering increases the power consumption of computer system 100 beyond a pre-specified limit.

After a memory command is issued from a memory bank command queue to the corresponding memory bank, command scheduler 202 may track a start time and an end time of the memory command in a timestamp table 230. Timestamp table 230 may include a number of entries representing the number of memory banks 216-222 in memory 104. Each entry in timestamp table 230 may contain information related to an in-flight memory command to the corresponding memory bank. For example, the entry may include an identifier for the memory bank, a type of the memory command, and an operating mode of the memory bank. After the memory command is issued to the memory bank, the entry may be updated with a start time representing the time of issuance of the memory command. Once the memory command completes, the entry may be updated with an end time representing the time of completion of the memory command. Timestamp table 230 is described in further detail below with respect to FIG. 3.

After the memory command has completed, command scheduler 202 may calculate a latency 226 of the memory command from the start and end times in timestamp table 230. For example, command scheduler 202 may obtain latency 226 by subtracting the start time of the memory command from the end time of the memory command. Command scheduler 202 may provide latency 226 to latency predictor 204, and latency predictor 204 may update the entry for the memory command in latency table 228 with latency table 228. For example, latency predictor 204 may use latency 226 to update an average latency and/or most recent latency that represents predicted latency 224 for the memory command. After latency table 228 is updated with latency table 228, the entry for the completed memory command in timestamp table 230 may be freed.

On the other hand, issuance of a high-latency memory command to a memory resource (e.g., a memory bank) may block subsequent memory commands to the same memory resource and negatively impact the performance of computer system 100. For example, the memory command may be a write command with a significantly higher latency than read commands to the same memory resource. As a result, the write command may block subsequent read commands to the same memory resource while the write command is processed by the memory resource.

To mitigate performance degradation associated with processing high-latency memory commands, command scheduler 202 may delay issuance of such memory commands. First, command scheduler 202 may use an admittance filter 236 to compare predicted latency 224 for each memory command to a latency threshold (e.g., a number of nanoseconds). If predicted latency 224 exceeds the latency threshold, command scheduler 202 and/or admittance filter 236 may assign an entry to the memory command in a write monitor 238 that is used to track and/or manage high-latency memory commands.

Write monitor 238 may function similarly to a cache, with each entry in write monitor 238 containing a valid bit, a memory address, memory instruction pointer, and/or thread identifier of a high-latency memory command (e.g., a write command), an average number of critical (e.g., read) commands blocked by the memory command, and/or the average latency of the blocked commands. Entries may be evicted from write monitor 238 when write monitor 238 runs out of space for unique pairs of memory command types and memory addresses, memory instruction pointers, and/or thread identifiers, and/or if the corresponding memory commands fall below one or more thresholds (e.g., latency threshold) set by admittance filter 236. Write monitor 238 is described in further detail below with respect to FIG. 4.

When a memory command enters command scheduler 202, write monitor 238 may be checked for a matching entry (e.g., an entry with the same type of memory command and memory address, memory instruction pointer, and/or thread identifier). If a matching entry is found in write monitor 238, command scheduler 202 may delay issuance of the memory command by placing the memory command in a defer queue 240 and/or not issuing the command to a memory resource (e.g., a memory bank).

Command scheduler 202 may continue delaying issuance of the memory command until one or more delay conditions are met. The delay condition(s) may include a fixed timeout, such as a pre-specified number of nanoseconds. The delay condition(s) may also include an issuance of an average number of blocked read commands (e.g., as obtained from the corresponding entry in write monitor 238) to the memory resource in front of the memory command. Similarly, the delay condition(s) may include the issuance of a sequence of blocked read commands in a command queue (e.g., memory bank command queues 208-214) ahead of the delayed memory command, such as read commands that were placed in the command queue as the entry was written to write monitor 238. Finally, the delay condition(s) may include idle time on the memory resource (e.g., a memory bank) used to process the memory command and/or occupancy of the command queue that falls below an occupancy threshold (e.g., a number of queued commands).

By performing prioritization and/or ordering of memory commands in host command queues 206 and/or memory bank command queues 208-214 based on the latency and/or other aspects or properties of the memory commands, the system of FIG. 2 may improve performance over computer systems that do not schedule memory commands according to memory access latencies. Moreover, because such prioritization and/or ordering is based on recent memory access latencies, the behavior of the system may be adapted to different memory technologies, computer architectures, process variations, temperatures, wear-out levels, bits per memory cell, power consumption levels, and/or other factors that can affect or change memory command latencies in computer system 100.

Timestamp Table

FIG. 3 shows timestamp table 230 in accordance with some embodiments. As described above, command scheduler 202 may use timestamp table 230 to track the latencies of in-flight memory commands to memory 104. As shown in FIG. 3, timestamp table 230 may include four columns 302-308 and a number of entries 310-316. Because, in some embodiments, only one memory command may be processed at a time by a memory resource (e.g., memory banks 216-222), the maximum number of entries 310-316 in timestamp table 230 may equal the number of memory resources in computer system 100. For example, the timestamp table 230 of FIG. 3 may contain four entries 310-316 representing in-flight commands to four different memory banks 216-222 in computer system 100.

Within timestamp table 230, column 302 may contain command identifiers (IDs) for the memory commands. For example, each entry 310-316 may include a numeric command ID (e.g., 0, 1, 2, 3, etc.) in column 302 that uniquely identifies the corresponding memory command (e.g., the bank to which the memory command is directed, the memory address to which the memory command is directed, and/or other information about or based on the memory command). Column 304 may specify options associated with each memory command. For example, column 304 may include a number of bits per cell (e.g., "MLC," "SLC," etc.), the use of an error-correcting code (e.g., "ECC"), and/or the type of memory command (e.g., "Read," "Write") associated with the command ID. Because each option may affect the latency of the command, such options are tracked in column 304 to facilitate accurate prediction of memory access latencies in computer system 100.

Column 306 may track a start time of each memory command, and column 308 may record the end time of the memory command. For example, the start and end times may be represented as a number of nanoseconds in timestamp table 230. In addition, timestamp table 230 may allocate a pre-specified number of bits for elements in columns 306-308, with each bit representing five nanoseconds of time. The start time may be recorded in timestamp table 230, along with the command ID and options, after the memory command is issued. Once the memory command completes, the corresponding entry in timestamp table 230 may be updated with the end time. The presence of both start and end times in entries 310-312 may indicate that memory commands represented by entries 310-312 have completed. On the other hand, the lack of an end time for entries 314-316 may indicate that memory commands represented by entries 314-316 have not yet completed.

After a memory command has completed, the latency of the memory command may then be calculated by subtracting the start time from the end time. For example, command scheduler 202 may calculate the latency of the memory command represented by entry 310 as 428-345, or 83 nanoseconds, and the latency of the memory command represented by entry 312 as 446-400, or 46 nanoseconds. The calculated latency may then be provided to latency predictor 204 for use in updating the predicted latency (e.g., predicted latency 224) of the memory command in latency table 228. For example, latency predictor 204 may include the calculated latency in a running average that is used as the predicted latency and/or replace a previous value of the predicted latency with the calculated latency. If the calculated latency exceeds a latency threshold of admittance filter 236, write monitor 238 may also be updated with an entry representing the memory command. After latency table 228 is updated with the calculated latency, the entry for the memory command in timestamp table 230 is freed. For example, the entry may be replaced with another entry for a subsequent memory command to the same memory resource.

Those skilled in the art will appreciate that columns 302-308 and/or entries 310-316 in timestamp table 230 may be represented in a number of ways. As discussed above, entries 310-316 may identify unique memory commands by the memory addresses, memory instruction pointers, thread identifiers, types, and/or options associated with the memory commands. Similarly, columns 302-308 and/or entries 310-316 may track various components of delay associated with processing the memory commands, including the times at which the memory commands enter and exit the corresponding host command queues 206 and/or memory bank command queues 208-214.

Write Monitor

FIG. 4 shows an entry in write monitor 238 in accordance with some embodiments. As described above, write monitor 238 may be used to identify, delay, and/or manage high-latency memory commands in computer system 100. For example, an entry in write monitor 238 that matches a memory command received by command scheduler 202 may cause the memory command to be delayed by command scheduler 202.

Such memory commands may be identified as memory commands with latencies that exceed a latency threshold of admittance filter 236. The memory commands may also be recorded in write monitor 238 based on other thresholds from admittance filter 236, in lieu of or in addition to the latency threshold. For example, a high-latency write command may be recorded in write monitor 238 if the latency of the write command exceeds the latency threshold and the priority of the write command falls below a priority threshold of admittance filter 236.

As shown in FIG. 4, the entry includes a valid 402 bit, a memory address 404 (in some embodiments value or values other than the address are used, such as a memory instruction pointer, a thread identifier, etc.), a number of blocked commands 406, and an average latency of blocked commands 408. Valid 402 may be a Boolean value that indicates if the memory command is valid or not. For example, valid 402 may be set if the memory command is valid and cleared if the memory command is invalid.

Memory address 404 may identify the memory location to be accessed by the memory command. Memory address 404 may be recorded with other information that can be used to uniquely identify the memory command, such as a memory instruction pointer, a thread identifier, the type of the memory command, options (e.g., number of bits per cell, error-correcting codes, etc.) associated with the memory command, the priority of the memory command, and/or the process from which the memory command was obtained.

Number of blocked commands 406 may represent the average number of critical (e.g., read) commands blocked by the memory command, and average latency of blocked commands 408 may contain the average latency, in nanoseconds, of commands typically blocked by the memory command. Number of blocked commands 406 and average latency of blocked commands 408 may be determined by command scheduler 202, latency predictor 204, and/or other components of memory controller 106. For example, command scheduler 202 may track the number of blocked commands 406 in a command queue while the memory command is processed by the memory resource. After the memory command has completed, command scheduler 202 may track the latencies of the blocked commands to obtain average latency of blocked commands 408. Alternatively, predicted latencies of the memory command and/or blocked commands from latency predictor 204 may be used to estimate number of blocked commands 406 and/or average latency of blocked commands 408.

Number of blocked commands 406 and average latency of blocked commands 408 may be used to determine a delay condition that must be satisfied before the memory command is issued. For example, number of blocked commands 406 may be multiplied by average latency of blocked commands 408 to obtain a fixed time-out during which the memory command is delayed. The fixed time-out may thus represent a period in which read commands that would normally be blocked by the memory command can be processed ahead of the memory command. In another example, the memory command may be delayed until the number of critical commands issued to the same memory resource reaches number of blocked commands 406. As mentioned above, other delay conditions may include an issuance of a sequence of blocked read commands in the command queue, idle time on the memory resource, and/or an occupancy of the command queue that falls below an occupancy threshold.

As mentioned above, write monitor 238 may function similarly to a cache with limited space. Entries may be evicted from write monitor 238 when write monitor 238 runs out of space for unique memory commands (e.g., as identified by the types, options, and/or memory addresses of the memory commands). Alternatively, an entry may be removed from write monitor 238 if one or more thresholds associated with admittance filter 236 are not met. For example, the entry may be deleted if the predicted and/or measured latency of the corresponding memory command falls below the latency threshold and/or the priority of the memory command exceeds the priority threshold.

Like latency table 228, entries in write monitor 238 may optionally be read by one or more processors (e.g., CPU 102) in the computer system. Write monitor 238 may also be flushed and/or logged to memory 104 so that the processor(s) can manage the blocking activity of high-latency memory commands, in lieu of or in addition to the actions of command scheduler 202. For example, the processor(s) may use information from write monitor 238 to perform operating system page remapping and/or change the physical memory address mapping function of computer system 100.

Processing a Memory Command in a Computer System

Figure 5:
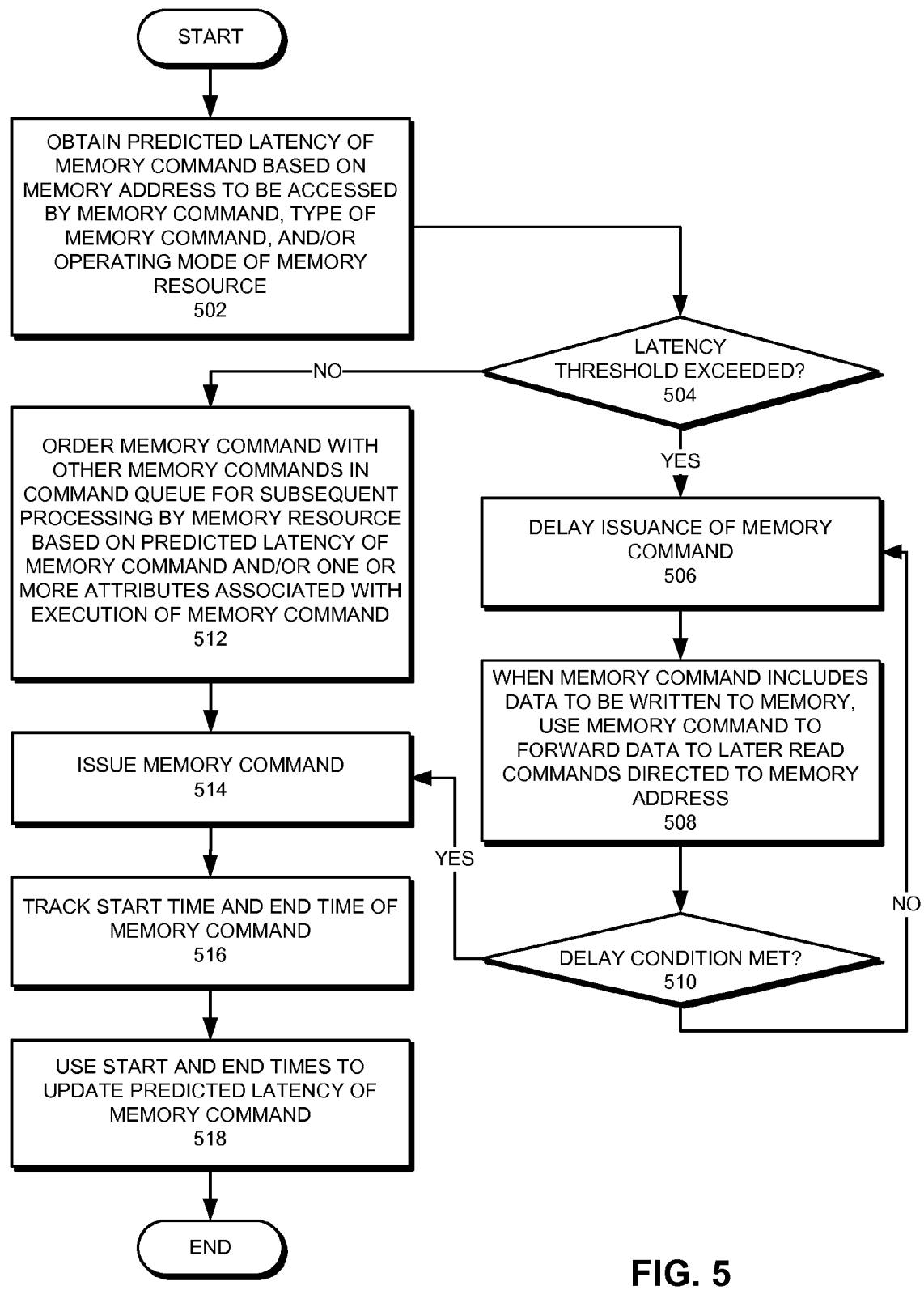
FIG. 5 shows a system for processing a memory command in a computer system in accordance with some embodiments.

FIG. 5 shows a system for processing a memory command in a computer system (e.g., computer system 100 of FIG. 1) in accordance with some embodiments. In some embodiments, one or more of the steps may be omitted, repeated, and/or performed in a different order. Accordingly, the specific arrangement of steps shown in FIG. 5 should not be construed as limiting the scope of the embodiments. Additionally, although certain mechanisms are used in describing the operations (e.g., CPU 102, command scheduler 202, latency predictor 204, write monitor 238, memory 104, memory controller 106, computer system 100, etc.), in some embodiments, other mechanisms perform the operations.

First, command scheduler 202 may obtain a predicted latency of the memory command based on the memory address to be accessed by the memory command, the type of the memory command, and/or the operating mode of a memory resource (operation 502) to be used in subsequent processing of the memory command. The type of the memory command may be a write command, a read command, an activate command, a pre-charge command, and/or another command used to access memory 104. The operating mode of the memory resource may include a number of bits per memory cell and/or an error-correcting code used by the memory resource.

The predicted latency may exceed a latency threshold (operation 504) set by admittance filter 236. The latency threshold may be used to identify high-latency memory commands, such as write commands to certain memory addresses. If the latency threshold is exceeded, issuance of the memory command is delayed (operation 506). For example, the memory command may be placed into a defer queue, or command scheduler 202 may delay issuance of the memory command to a memory resource.

While the memory command is delayed, command scheduler 202 may use memory command to forward data to later read commands directed to the memory address when the memory command includes data to be written to memory (operation 508). For example, the later read commands may be processed by returning data to be written by the memory command to the read commands.

The memory command may be delayed until a delay condition is met (operation 510). The delay condition may include a fixed time-out, an issuance of an average number of blocked read commands in front of the memory command, an issuance of a sequence of blocked read commands in the same command queue as the memory command, idle time on the memory resource, and/or an occupancy of the command queue that falls below an occupancy threshold. If the delay condition is not met, issuance of the memory command is further delayed (operation 506), and any data to be written to memory by the memory command may be forwarded to later read commands directed to the same memory address (operation 508). Once the delay condition is met, command scheduler 202 issues the memory command (operation 514).

If the latency threshold is not exceeded by the memory command, command scheduler 202 orders the memory command with other memory commands in the command queue for subsequent processing by the memory resource based on the predicted latency of the memory command and/or one or more attributes associated with execution of the memory command (operation 512). The attribute(s) may include a priority of the memory command and/or power consumption associated with ordering of the memory command. For example, the memory commands may be ordered in the queue according to a scheduling technique such as FRFCFS, banked FIFO, and/or hold grant, with the predicated latencies of the memory commands used to order higher-latency memory commands ahead of lower-latency memory commands in the same command queue. Alternatively, if a memory command is flagged as high-priority, the predicted latency of the memory command may be ignored during ordering of the memory command in the command queue. Finally, reordering of the memory commands in the command queue may be averted if such reordering increases the power consumption of computer system 100 beyond a pre-specified threshold.

The memory command may then be issued (operation 514) from the command queue according to the ordering of memory commands in the command queue. For example, the memory command may be issued from a memory bank command queue to a memory bank for processing of the memory command. Once the memory command is issued, the start time and end time of the memory command are tracked (operation 516). For example, the start time may be recorded as the time of issuance of the memory command, and the end time may be recorded as the time of completion of the memory command. Other start and end times associated with the memory command (e.g., times in and out of the command queue) may also be tracked to enable finer-grained prediction of the various latencies associated with the memory command.

Finally, the start and end times are used to update the predicted latency of the memory command (operation 518). The start and end times may be used to calculate the latency of the memory command, and latency predictor 204 may use the calculated latency to update the predicted latency of the memory command in latency table 228 (e.g., as a running average latency and/or by replacing the previous value of the predicted latency). For example, latency table 228 may be maintained by grouping memory addresses in an address space of the computer system into a set of memory address regions, maintaining a predicted latency for each of the memory address regions, and obtaining the predicted latency of each memory command based on a memory address region in which the memory address is grouped. Alternatively, latency table 228 may track the latencies of individual memory commands and/or group memory commands into Bloom filters representing ranges of latencies. The predicted latency may then be retrieved from latency table 228 during subsequent scheduling of the memory command by command scheduler 202.

In some embodiments, a computer system (e.g., computer system 100 in FIG. 1 and/or some portion thereof) uses code and/or data stored on a computer-readable storage medium to perform some or all of the operations herein described. More specifically, the computer system reads the code and/or data from the computer-readable storage medium and executes the code and/or uses the data when performing the described operations.

A computer-readable storage medium can be any device or medium or combination thereof that stores code and/or data for use by a computer system. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computer system 100 and/or some portion thereof) is stored on a computer-readable storage medium that includes a database or other data structure which can be read by a computer system and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for processing a memory command on a computer system, comprising:
   obtaining, by a command scheduler executing on a memory controller of the computer system, a predicted latency of the memory command based on a memory address to be accessed by the memory command; and
   ordering, by the command scheduler, the memory command with other memory commands in a command queue for subsequent processing by a memory resource on the computer system based on the predicted latency of the memory command, wherein ordering the memory command comprises, when the predicted latency exceeds a latency threshold, delaying issuance of the memory command until a delay condition is met, wherein, while issuance of the memory command is delayed, when the memory command comprises data to be written to the memory, using the memory command to forward data to later read commands directed to the memory address.

2. The method of claim 1, further comprising:
   after the memory command is issued from the command queue to the memory resource, tracking a start time and an end time of the memory command; and
   using the start time and the end time to update the predicted latency of the memory command.

3. The method of claim 2, wherein tracking the start time and the end time of the memory command comprises:
   updating a timestamp table of in-flight memory commands in the computer system with the start time and the end time.

4. The method of claim 1, further comprising:
   additionally ordering the memory command with the other memory commands in the command queue based on one or more attributes associated with execution of the memory command.

5. The method of claim 4, wherein the one or more attributes comprise at least one of:
   a priority of the memory command; and
   a power consumption associated with the memory command.

6. The method of claim 1, further comprising:
   obtaining the predicted latency of the memory command based on a type of the memory command, wherein the type of the memory command is at least one of:
   a read command;
   a write command;
   an activate command; and
   a pre-charge command.

7. The method of claim 1, further comprising:
   obtaining the predicted latency of the memory command based on an operating mode of the memory resource, wherein the operating mode of the memory resource is associated with at least one of:
a number of bits per memory cell; and
an error-correcting code used by the memory resource.

8. The method of claim 1, wherein the delay condition is at least one of:
a fixed time-out;
an issuance of an average number of blocked read commands in front of the memory command;
an issuance of a sequence of blocked read commands in the command queue;
idle time on the memory resource; and
an occupancy of the command queue that falls below an occupancy threshold.

9. The method of claim 1, wherein obtaining the predicted latency of the memory command based on the memory address to be accessed by the memory command comprises:
grouping memory addresses in an address space of the computer system into a set of memory address regions;
maintaining a predicted latency for each of the memory address regions; and
obtaining the predicted latency of the memory command based on a memory address region in which the memory address is grouped.

10. A computer system comprising:
a processor;
a memory; and
a memory controller that performs operations for executing a command scheduler, the operations comprising:
obtaining a predicted latency of a memory command from the processor based on a memory address to be accessed by the memory command; and
ordering the memory command with other memory commands in a command queue for subsequent processing by the memory based on the predicted latency of the memory command, wherein ordering the memory command comprises, when the predicted latency exceeds a latency threshold, delaying issuance of the memory command until a delay condition is met, wherein, while issuance of the memory command is delayed, when the memory command comprises data to be written to the memory, using the memory command to forward data to later read commands directed to the memory address.

11. The computer system of claim 10, wherein the memory controller further performs operations comprising:
after the memory command is issued from the command queue to the memory, tracking a start time and an end time of the memory command; and
using the start time and the end time to update the predicted latency of the memory command.

12. The computer system of claim 10, wherein the memory controller further performs operations comprising:
additionally ordering the memory command with the other memory commands in the command queue based on one or more attributes associated with execution of the memory command.

13. The computer system of claim 12, wherein the one or more attributes comprise at least one of:
a priority of the memory command; and
a power consumption associated with the memory command.

14. The computer system of claim 10, wherein the memory controller further performs operations comprising:
obtaining the predicted latency of the memory command based on a type of the memory command, wherein the type of the memory command is at least one of:
a read command;
a write command;
an activate command; and
a pre-charge command.

15. The computer system of claim 10, wherein the memory controller further performs operations comprising:
obtaining the predicted latency of the memory command based on an operating mode of the memory, wherein the operating mode of the memory is associated with at least one of:
a number of bits per memory cell; and
an error-correcting code used by the memory.

16. The computer system of claim 10, wherein the delay condition is at least one of:
a fixed time-out;
an issuance of an average number of blocked read commands in front of the memory command;
an issuance of a sequence of blocked read commands in the command queue;
idle time on the memory; and
an occupancy of the command queue that falls below an occupancy threshold.

17. A non-transitory computer-readable storage medium storing instructions that when executed by a computer cause the computer to perform a method for processing a memory command on a computer system, the method comprising:
obtaining, by a command scheduler executing on a memory controller of the computer system, a predicted latency of the memory command based on a memory address to be accessed by the memory command; and
ordering, by the command scheduler, the memory command with other memory commands in a command queue for subsequent processing by a memory resource on the computer system based on the predicted latency of the memory command, wherein ordering the memory command comprises, when the predicted latency exceeds a latency threshold, delaying issuance of the memory command until a delay condition is met, wherein, while issuance of the memory command is delayed, when the memory command comprises data to be written to the memory, using the memory command to forward data to later read commands directed to the memory address.

* * * * *